United States Patent [19]

Hannah

[11] 4,225,143

[45] Sep. 30, 1980

[54] GUIDED EXPANSION JOINT

[75] Inventor: Martin J. Hannah, Williamsville, N.Y.

[73] Assignee: Advanced Thermal Systems, Inc., Lancaster, N.Y.

[21] Appl. No.: 916,585

[22] Filed: Jun. 19, 1978

[51] Int. Cl.² ............................................. F16L 27/02
[52] U.S. Cl. .................... 277/11; 277/207 A; 285/231; 285/302; 308/36
[58] Field of Search .................. 277/59, 21, 68, 11, 277/207 A; 285/231, 302; 308/36, 37, 238

[56] References Cited

U.S. PATENT DOCUMENTS

| | | | |
|---|---|---|---|
| 1,947,072 | 2/1934 | Walton et al. | 277/68 X |
| 2,319,543 | 5/1943 | Hall | 277/28 |
| 3,026,114 | 3/1962 | Andresen et al. | 277/68 |
| 3,082,012 | 3/1963 | Rhodes | 277/21 X |
| 3,473,060 | 10/1969 | Powell | 308/238 X |
| 3,876,213 | 4/1975 | Miliczky et al. | 277/2 |
| 3,932,007 | 1/1976 | Schnell | 308/238 |

FOREIGN PATENT DOCUMENTS 981498  1/1965  United Kingdom ................. 285/302

Primary Examiner—Thomas F. Callaghan
Attorney, Agent, or Firm—Bean, Kauffman & Bean

[57] ABSTRACT

A guided expansion joint (1) for fluidically connecting two pipes (2,3) in sealed relationship includes low friction annular guides (11,12) at each end of the expansion joint (1) intermediate the slip (4) and the external sleeve (5). A conventional stuffing box (18) provides the seal between the external sleeve (5) and slip (4) while the annular guides (11,12) protect the slip (4) against wear and scoring in the event that the slip (4) and external sleeve (5) depart from the preferred aligned relationship.

3 Claims, 5 Drawing Figures

GUIDED EXPANSION JOINT

TECHNICAL FIELD OF THE INVENTION

The present invention relates to expansion joints for accommodating thermal expansion of a fluid conduit which may be expected to carry fluids of varying temperatures. More specifically, the invention relates to an expansion joint having guides which prevent scoring of the sliding members in the event that the joint becomes misaligned.

BACKGROUND OF THE INVENTION

Conventional expansion joints employ stuffing boxes of the type which have inner and outer telescopically arranged members forming an annular chamber therebetween for receiving a semi-plastic packing material. When the packing material is packed into this chamber under pressure, a reliable seal is established. The seal is maintained even when the outer and inner telescopically arranged members move relative to one another. For example, prior known designs of expansion joints which utilize stuffing boxes are disclosed in U.S. Pat. Nos. 1,151,614; 1,947,072; 1,960,041; 1,989,644; 1,953,493; 2,319,543; 2,714,024; 3,258,271 and 3,876,213.

The reliability of a packed expansion joint is dependent upon the effectiveness of the seal established between the stuffing box packing and the adjacent surface of the adjacent member which slides relative to the stuffing box. Said surface is ordinarily the exterior surface of the interior telescopic member and usually comprises a highly polished, hard, smooth coating material such as chrome. It is essential to maintain this surface in an unscored, unworn condition in order to assure a proper seal.

As far as is known, all prior expansion joints have had the deficiencies that the exterior sleeve, in which the stuffing box cavity is formed, tends to score or otherwise wear the smooth exterior surface of the interior telescopic member when the two cylindrical members become misaligned. Such scoring or wear resulting from metal to metal sliding contact rapidly leads to failure of the seal established by the stuffing box. Misalignment of the telescopic inner and outer members may be expected to occur as a result of maladjustment or failure of a pipe support which causes the axes of the members to be skewed relative to one another or as a result of a packing operation which asymmetrically loads up one side of the stuffing box thereby causing the inner and outer telescopic members to be shifted laterally relative to one another.

Expansion joints of the above discussed type are specifically provided to absorb thermal expansion in a pipeline which carries fluids of fluxuating temperatures. Pipeline systems lacking expansion joints or having jammed expansion joints caused by corrosion of the joint or misalignment of the joint can develop tremendous stresses. The unrelieved stresses of such a system may result in damage to or destruction of overstressed pipe hangers and/or components of the system. Thus is posed the technical problem of providing an expansion joint which avoids scoring or wear of the highly polished slip surface even though the inner and outer members become misaligned.

THE INVENTION

The subject invention provides an improved expansion joint which overcomes the above described difficulties of the prior known designs in a simple yet elegant manner. The expansion joint according to the invention comprises a pair of annular guide rings disposed between the inner and outer telescopic members at axially opposite ends of the outer member on opposite sides of the stuffing box. The guide rings comprise a low friction material of limited compressibility having a radial thickness which is no greater than the radial distance between the outer surface of the inner member and the inner surface of the outer member when the members are co-axially disposed. With this arrangement, the guide rings permit relative telescopic movement between the outer and inner members without permitting contact therebetween in the event the central axes of the outer and inner members become misaligned.

It is a characteristic of the expansion joint of the present invention that the radial thickness of each of the guide rings is less than the radial distance between the outer surface of the inner member and the inner surface of the outer member when the expansion joint is at its maximum rated temperature, thereby avoiding the tendency of the expansion joint to bind up when at its maximum operating temperature. The guide rings are desirably received within annular grooves formed in the inner surface of the outer telescopic member. Said grooves also desirably have a depth less than the thickness of the respective guide ring. In this manner, it is assured that the inner and outer members do not come into metal to metal contact so that scoring and wear therebetween is prevented.

BRIEF DESCRIPTION OF THE DRAWINGS

The present invention may be better understood and its numerous objects and advantages will become apparent to those skilled in the art by reference to the accompanying drawings wherein like reference numerals refer to like elements in the several figures and in which.

BRIEF DESCRIPTION OF THE BEST MODE OF THE INVENTION

Figure 1:
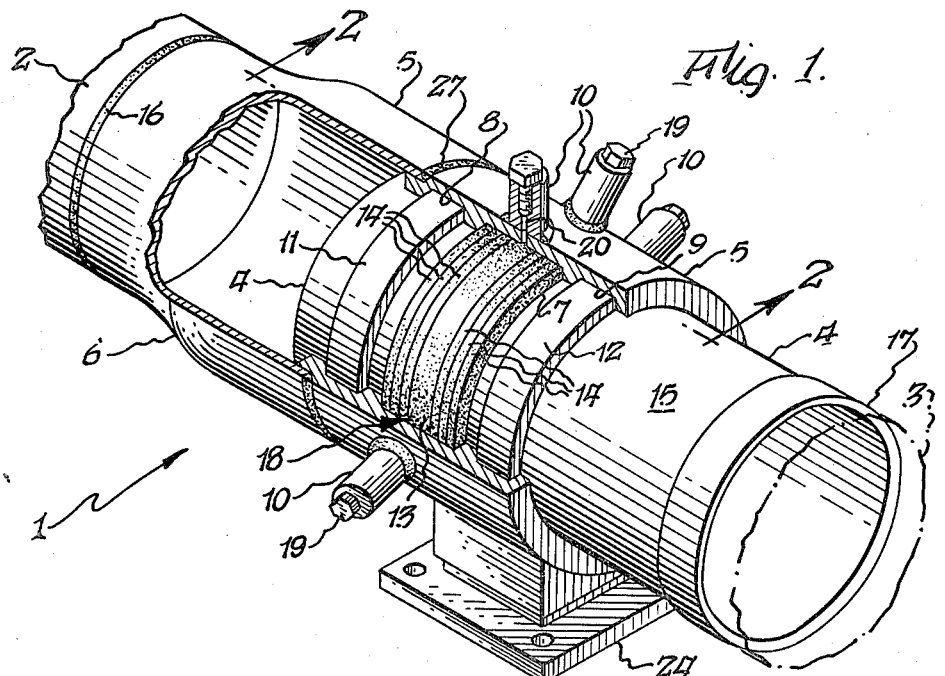
FIG. 1 is a quarter break-away perspective view of the expansion joint of the present invention.
Figure 2:
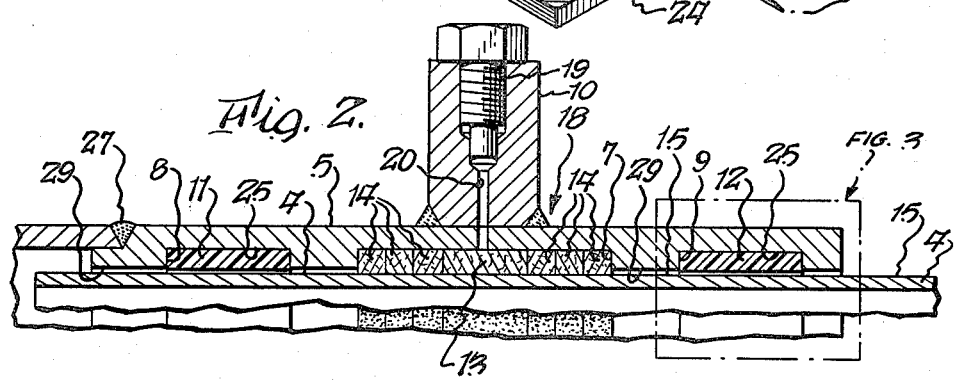
FIG. 2 is an enlarged cross-sectional view of a portion of the joint taken along view lines 2—2 of FIG. 1.
Figure 3:
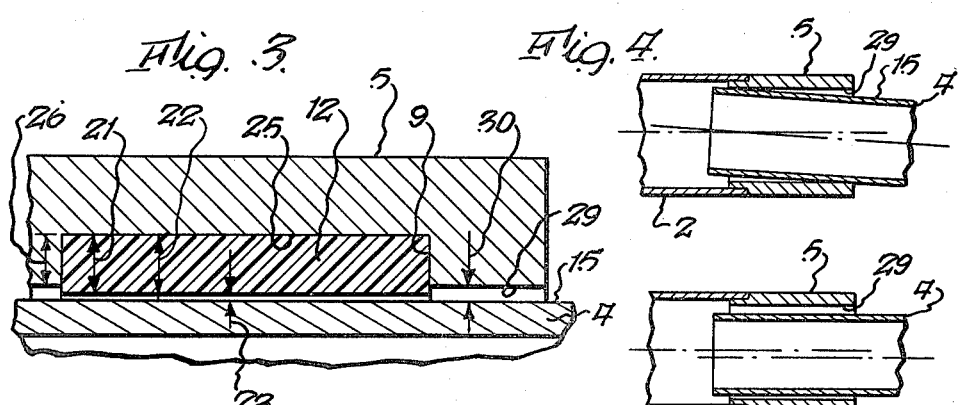
FIG. 3 is an enlargement of the indicated portion of FIG. 2.

While the invention is susceptible of various modifications and alternative constructions, there is shown in the drawings and there will hereinafter be described, in detail, a description of the preferred or best known mode of the invention. It is to be understood, however, that the specific description and drawings are not intended to limit the invention to the specific form disclosed. On the contrary, it is intended that the scope of this patent include all modifications and alternative constructions thereof falling within the spirit and scope of the invention as expressed in the appended claims, to the full range of their equivalents.

Turning now to the figures, an expansion joint according to the invention of this application will be described and discussed, in detail, with specific reference to its various parts and operations. FIG. 1 shows a perspective cut-away view of an expansion joint 1 which is mounted intermediate of and fluidically connected to a pair of fluid conduits or pipes 2 and 3. Welds 16 and 17 or other suitable fluid sealing devices such as flanged connectors may be utilized to make these connections. The expansion joint comprises an inner cylindrical slip member 4 connected at one end to pipe 3 and a cylindrical outer sleeve member 5 connected to pipe 2 at the opposite end of the expansion joint. The exterior surface of slip 4 is fabricated to include a hard, chrome plated, highly polished surface 15. As will become evident hereafter, conservation of the integrity of this highly polished, hard chrome surface is essential to assure a continuing fluid seal established by the stuffing box of the expansion joint. One end of the outer cylindrical member 5 may desirably take the form of an adaptor section, as shown, to reduce the diameter of member 5 to the diameter of the pipe at the location of weld 16.

Outer sleeve member 5 is configured to form a stuffing box, generally indicated at 18. Stuffing box 18 includes an interior annular groove 7 and one or more radially directed passages 20 communicating between annular groove 7 and one of a plurality of fittings 10 provided for packing the stuffing box. The internal bore of fitting 10 is threaded to receive therein a removeable threaded plug 19 provided for maintaining the pressurized condition of the stuffing box after packing material has been packed into groove 7 under pressure. In a conventional manner, a plurality of compressible seal rings 14 are placed within annular groove 7 at its opposite axial ends to retain the pressurized packing material within the annular groove 7. The packing material 13, such as a semi-plastic asbestos compound or a high performance asbestos free semi-plastic packing material (for example a self-lubricating flake graphite substance) is then injected under high pressure through fitting 10 and passage 20 into the central annular groove 7 of the stuffing box. As a result of the high pressure of this packing material 13, sealing rings 14 are axially compressed with concommitent radial expansion. The radial expansion causes the inner surfaces of the sealing rings 14 to contact the exterior surface 15 of slip member 4 to thereby make the fluid tight seal. Additionally, the semi-plastic packing material 13 also contacts the exterior surface 15 of slip 4 to assist in establishing the fluid tight seal. This seal is maintained when thermal expansion or contraction of pipes 2 and 3 causes the slip 4 to translate axially with respect to external sleeve 5 due to the uniformity of the highly polished surface 15 as well as to the high pressures maintained in the resilient packing materials.

Such a seal may be expected to deteriorate and fail, however, if the highly polished surface 15 were permitted to corrode or otherwise wear. Such corrosion is accelerated under the high temperatures experienced by a typical expansion joint especially when a caustic or otherwise chemically active fluid is confined by the piping system. The corrosive or oxidizing effects on the sliding surface 15 of the interior cylindrical member 4 is resisted by a hard, highly polished surface such as established by chrome plating the exterior of interior slip member 4. The effectiveness of the resistance to corrosion and oxidation is reduced, however, when the integrity of the chrome surface 15 is destroyed such as might occur by a scratch, or a worn spot. It will be recognized that any surface defect such as a scratch or a corroded area will detrimentally effect the seal established by the stuffing box 18 when the expansion joint telescopically expands or contracts in a manner which causes the defective area of surface 15 to slide into contact with and over the sealing surfaces established by packing material 13 and seal rings 14. Therefore, it is of utmost importance for the continuing life of the expansion joint to protect and conserve the integrity of the exterior surface 15 of slip 4.

Figure 4:
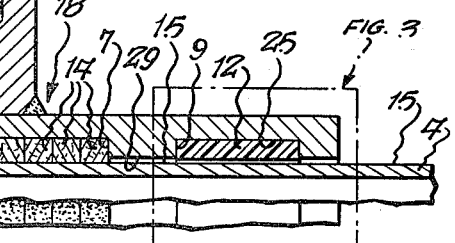
FIGS. 4 and 5 respectively diagrammatically represent a skewed misalignment condition of the expansion joint and a laterally displaced misalignment condition of the expansion joint.
Figure 5:
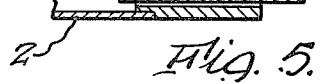

When properly installed, the central axes of pipes 2 and 3 and the central axes of inner member 4 and outer member 5 of the expansion joint 1 are all aligned to be colinear. With this condition, thermal expansion caused translation of inner member 4 relative to external sleeve 5 causes no damage to the adjacent translating surfaces since the expansion joint is manufactured to maintain a minimum radial clearance when the fluid in the system attains the maximum rated temperature of the expansion joint. As previously described, difficulties nevertheless arise however when, for one reason or another, the central axes of the inner and outer members 4 and 5 are forced out of alignment. Such an event may occur under at least two circumstances diagrammatically illustrated in FIGS. 4 and 5: the first being a result of misalignment of the connected pipes which may be caused by faulty installation or failure of a pipe hanger, and the second being a result of the non-symmetrical packing of the stuffing box 18 which causes lateral displacement of the elements of the expansion joint relative to one another. Asymmetrical packing of the stuffing box may occur when packing material 13 is injected into the stuffing box at one circumferential position without equal injection at the diametric opposite circumferential position as may occur when the pipe is mounted adjacent to a wall so that only the fittings on one side of the pipe are accessible.

The present invention seeks to solve the problems which arise due to the misalignment of inner and outer members 4 and 5 caused in either of the above manners by providing axially spaced annular guide rings 11 and 12 for disposition between the outer and inner members 5 and 4 respectively at axially opposite end of the outer member 5. Guide rings 11 and 12 maintain a gap or minimum clearance 30, in all cases, between members 4 and 5 to prevent their metal to metal contact. Guide rings 11 and 12 consist of a low friction material of limited compressibility.

In the embodiment shown in the figures, guide rings 11 and 12 are seated within annular grooves 8 and 9 which serve to position and orient the rings. In this configuration, outer member 5 has an inner surface 29 which is interrupted by annular grooves 8 and 9 whose bottom inwardly facing surfaces are indicated by numeral 25. The guide rings are desirably fixed to surface 25 but may alternatively be placed loosely within the grooves. Guide rings 11 and 12 have radial thicknesses 21 intended to assure that a clearance gap 30 is maintained. Thus, in the embodiment shown, thickness 21 is provided to be greater than depth 26 of grooves 8 and 9 in member 5. With this arrangement, gap 30 will be maintained even when members 4 and 5 become coaxially misaligned. Desirably, thickness 21 is no greater than the radial distance 22 between the outer surface 15 of the inner member 4 and surface 25 of the outer member 5 when the expansion joint has obtained its maximum operating temperature. The creation of unnecessary friction between member 4 and the guide rings 11 and 12 at this maximum operating temperature is thereby avoided. Thus, at less than maximum operating temperature a gap 23 is maintained between each of the guide rings and surface 15.

As maximum operating temperature of the joint 1 is approached, gap 23 will diminish. When the elements of the expansion joint are properly designed, however, the thermal expansion of the components of the expansion joint at its maximum rated temperature does not bring surface 15 and the guide rings into forceable contact with one another even though gap 23 is eliminated and slight contact established. As a result of these specific relationships, binding of the expansion joint caused by radial thermal expansion does not tend to occur.

It is evident that the concepts of the present invention may be practiced in an expansion joint (1) lacking annular grooves 8 and 9. In this case, guide rings 11 and 12 are fastened directly to either of the uninterrupted surfaces 15 and 29; fixation to surface 29 being preferred. Many of the same design criteria apply in this alternate embodiment. The objective of maintaining gap 30 remains and is accomplished by the thickness 21 of guide rings 11 and 12. Maintenance of gap 23 up to the maximum rated operating temperature of the expansion joint in order to minimize axially directed friction forces between members 4 and 5 also remains of primary importance and is assured by providing guide rings 11, 12 having a radial thickness 21 which is no greater than the radial distance 22 between the outer surface 15 of the inner member 4 and the inner surface 29 of the outer member 5 when the expansion joint is at its maximum rated temperature.

The characteristics of the material from which the guide rings 11 and 12 are fabricated is critical to the correct operation of the invention. While it is important to maintain minimum clearances so as to prevent binding due to metal to metal contact between the slip and external sleeve as previously described, it is of equal importance to avoid scoring the slip surface 15 by the rings themselves. Thus, guide rings 11 and 12 must consist of a low friction and abrasive resistant material which has the ability to resist substantial compressive deformation while at the same time being substantially "softer" or "more compressible" than conventional expansion joint bearing materials, such as bronze, so that the guide rings do not dig into surface 15 under the substantial "misalignment" pressures that may be encountered.

One material found to possess these specific properties is a bronze filled polyetetrafluoroethylene with about a 2 to 3 weight ratio of polytetrafluoroethylene to bronze and about a 7 to 3 volume ratio. Such material has a density of about 234 to 243 slugs per cubic foot and a hardness index of 55 to 70 on the shore D scale. Additional properties are coefficient of static friction, 0.07 to 0.17; coefficient of dynamic friction; about 0.13; tensile strength, about 1000 to 2000 psi; compression strength, about 500 psi; and a coefficient of thermal expansion about $4.4 \times 10^{-5}$ to $7.5 \times 10^{-5}$ inches/degree F. In actual tests, this bronze filled polytetrafluoroethylene has incurred only 0.004 in. wear after 75,000 completed cycles (62,500 feet total traverse). Another material found to possess acceptible properties for this particular expansion joint guide ring application is an asbestos-graphite compound bonded together with a nonrigid binder capable of withstanding high temperatures without deterioration.

To evaluate the effectiveness of the guide rings of the present invention under severe slip misalignment conditions, comparison tests were conducted using a single 8 inch, 150 lb. flanged double expansion joint supported on a cycle test machine of the type adapted to cycle only one slip at a time. The expansion joint had both of its stuffing boxes packed with standard polytetrafluoroethylene-asbestos packing material and the slip associated with each stuffing box was provided with a 2 mil thick hard chrome surface coating. As fabricated, the double expansion joint was conventional except that the slip associated with one of its expansion joints had its surface protected by the guide rings of the present invention.

EXAMPLE I

The slip protected by the guide rings was first cycled with a severe misalignment introduced by inserting a ¼ inch shim between its flange and the cross head of the cycle test machine to which the slip flange was tightly bolted. The cycle test machine was activated to cycle at a rate of three cycles per minute for a traverse of 5 inches. The force required to compress and extend the slip was approximately 650 lb. per inch of nominal diameter. After 2,046 cycles, the test was terminated and the slip was removed for detailed inspection. There were no appreciable signs of scoring or wear of the chrome surface of the slip or the guide rings.

EXAMPLE II

A similarly produced misalignment was then introduced for the slip of the opposite stuffing box, which was not provided with guide rings. The cycle test machine was again activated at 3 cycles per minute for a traverse of 5 inches. Scoring of the chrome slip was immediately apparent and the test was terminated after 70 cycles due to the severe scoring of the slip. The force required to cycle the slip was noted as being 775 lbs. per inch of nominal diameter at the start of this test. The force increased during each cycle until approximately 1,100 lbs. per inch of nominal diameter was required at the end of the test.

The misalignment tests were conducted in the absence of steam. Under similar conditions of temperature, stuffing box packing compositions and slip surface finish and for the case where slips are disposed in accurate alignment with their stuffing boxes, a force of about 400 lbs. per inch of nominal diameter would be required to cycle each slip, since under these conditions, there is no contact between the slip surfaces and the outer guide surfaces defined by either the stuffing box or guide rings.

What is claimed is:

1. In an expansion joint (1) for fluidically connecting in a sealed relationship adjacent ends of two conduits (2, 3) adapted for carrying fluids of varying temperatures, said expansion joint comprising telescopically arranged outer (5) and inner (4) members adapted to be connected one to each of said conduits, said outer member defining an annular packing chamber (7) opening through its inner surface (29) for containing packing rings (14) at its opposite ends and a pressurized semiplastic packing composition (13) intermediate said packing rings, said packing rings and packing composition being arranged in a fluid sealing engagement with a highly polished outer surface (15) of said inner member, the improvement for inhibiting score producing engagement of said polished surface (15) with said inner surface (29) incident to misalignment of said outer and inner members (5, 4) while permitting telescopic movements therebetween, characterized in that said outer member (5) carries a pair of annular guide rings (11 and 12) disposed at fixed distances from said packing chamber (7) and at axially opposite ends of said outer member (5), said guide rings (11 and 12) extending radially inwardly of said inner surface (29) and being sized to maintain a radial gap (23) with said polished surface (15) up to a maximum rated operating temperature of said expansion joint (1) when said outer and inner members (5, 4) are disposed in axial alignment, and said guide rings (11 and 12) are formed of a low friction and abrasive resistant material capable of resisting substantial compressive deformation for inhibiting said score producing engagement between said polished surface (15) and said inner surface (29) while being sufficiently soft to avoid scoring of said polished surface (15) by said guide rings (11 and 12) when said outer and inner members (5, 4) are disposed out of axial alignment.

2. The expansion joint (1) as recited in claim 1 characterized in that said guide rings (11,12) comprise polytetrafluoroethylene impregnated with bronze.

3. The expansion joint (1) as recited in claim 1 characterized in that said guide rings (11,12) comprise an asbestos-graphite composit bound together with a heat resistant, non-rigid binder.

* * * * *

UNITED STATES PATENT AND TRADEMARK OFFICE
CERTIFICATE OF CORRECTION

PATENT NO. : 4,225,143
DATED : Sept. 30, 1980
INVENTOR(S) : Martin J. Hannah

It is certified that error appears in the above-identified patent and that said Letters Patent are hereby corrected as shown below:

Col. 5, Line 56 - "500" should be --- 5,000 ---.

Signed and Sealed this

Third Day of February 1981

[SEAL]

Attest:

RENE D. TEGTMEYER

*Attesting Officer*     *Acting Commissioner of Patents and Trademarks*